(No Model.) 2 Sheets—Sheet 1.
F. O. BLACKWELL.
CONDUIT FOR ELECTRIC RAILWAYS.
No. 471,375. Patented Mar. 22, 1892.
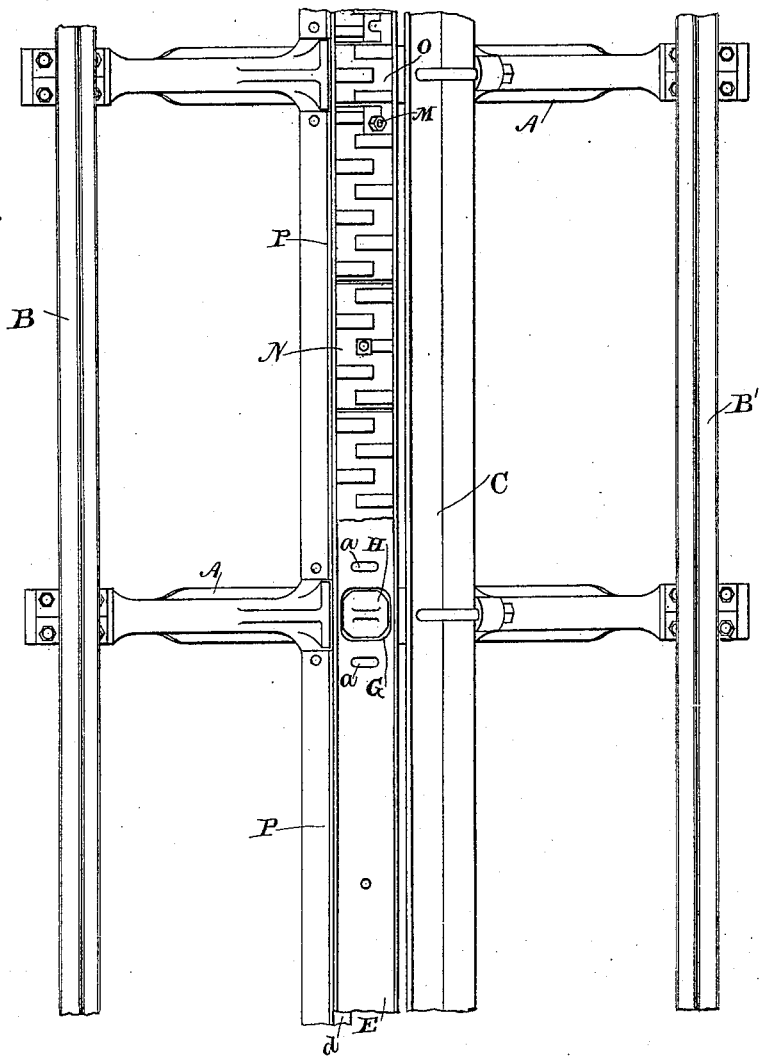
Fig. 1.
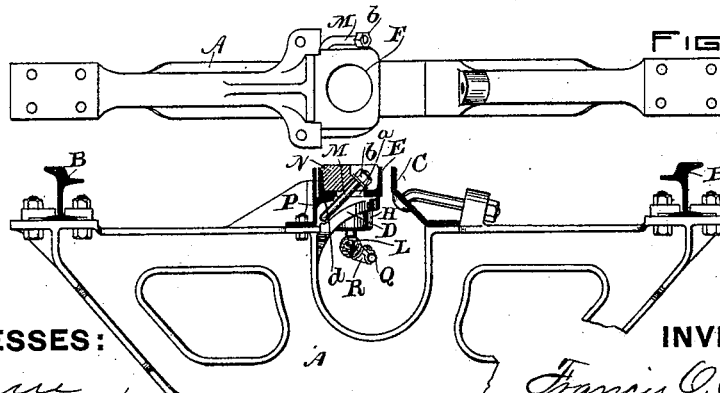
Fig. 2.
Fig. 3.
WITNESSES:
INVENTOR:
Francis O. Blackwell
by Bentley & Wright
ATTYS.

(No Model.)  2 Sheets—Sheet 2.
F. O. BLACKWELL.
CONDUIT FOR ELECTRIC RAILWAYS.
No. 471,375. Patented Mar. 22, 1892.
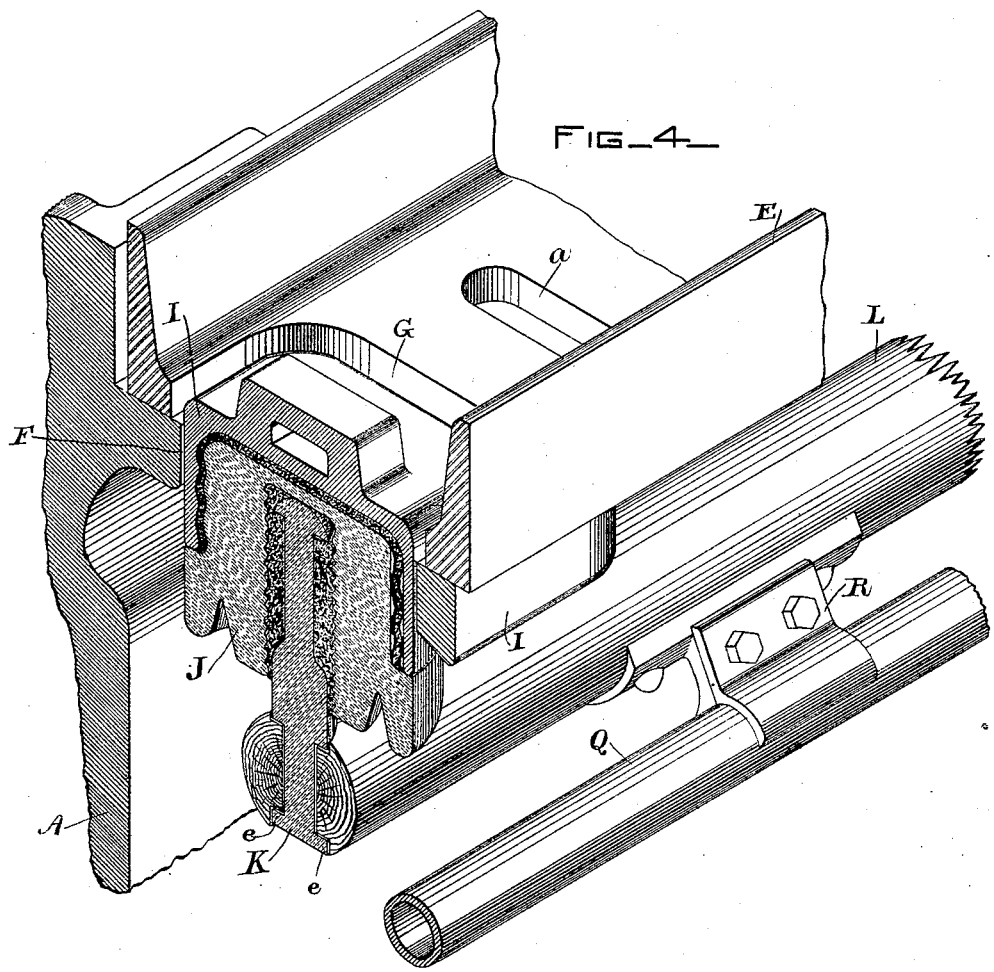
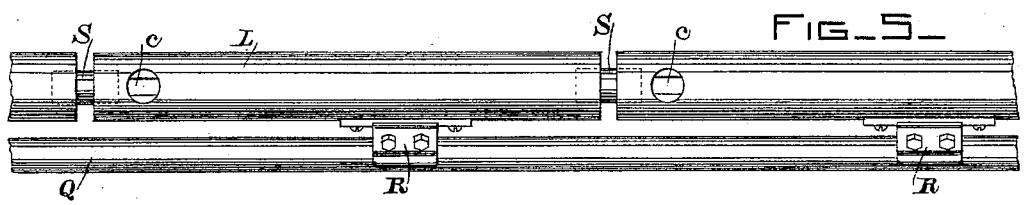
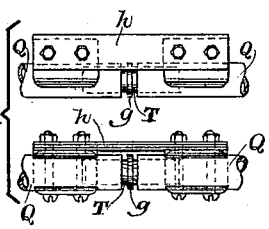
WITNESSES:
INVENTOR:
Francis O. Blackwell
by Betley Knight
ATTYS.

UNITED STATES PATENT OFFICE.

FRANCIS O. BLACKWELL, OF BOSTON, MASSACHUSETTS, ASSIGNOR TO THE THOMSON-HOUSTON ELECTRIC COMPANY, OF CONNECTICUT.

CONDUIT FOR ELECTRIC RAILWAYS.

SPECIFICATION forming part of Letters Patent No. 471,375, dated March 22, 1892.

Application filed November 8, 1890. Serial No. 370,748. (No model.)

*To all whom it may concern:*

Be it known that I, FRANCIS O. BLACKWELL, a citizen of the United States, residing at Boston, county of Suffolk, and State of Massachusetts, have invented a certain new and useful Improvement in Conduits for Electric Railways, of which the following is a specification.

My invention relates to a conduit system of electric railways; and it consists of certain features of construction hereinafter pointed out at length. It aims to provide a rigid and enduring street structure, a high degree of insulation for the supply-conductor, and ready access to the conduit for removing and replacing the insulators. All these improvements are illustrated in the accompanying drawings, wherein—

Figure 1 is a plan view showing a section of conduit. Fig. 2 is a plan view of one of the transverse yokes. Fig. 3 is a transverse section of the conduit. Fig. 4 is an enlarged section of the yoke, taken through one of the insulator-hangers. Fig. 5 is a plan view of the wooden strip and insulator attached thereto, and Fig. 6 shows in side elevation and plan the expansion-joint between adjacent conductor-sections.

In the figures, A represents a transverse yoke, upon the ends of which are seated the track-rails B B'. These yokes are set below the pavement a suitable distance apart to form the foundation part of the conduit, as is well known both in this art and in cable-railway structures. An angular slot-rail C, bolted to the yokes, forms one edge of the slot, and on the other side of the yokes there is provided a bracket D, raised, as shown, and projecting inwardly toward the slot, upon which is seated a channel slot-rail E, which constitutes the second edge of the slot. Through these brackets there is an opening or socket F, (shown circular in cross-section,) and in the slot-rail E there is a registering opening or perforation G, slightly larger than F and squared. The insulator-hangers H are seated in and match these openings, and as the brackets are directly over the air-space in the conduit the hangers may with great convenience be replaced and inserted directly into the position which it is desired they should occupy. This same advantage may be gained by otherwise shaping or constructing the conduit, so as to bring a like overhanging portion at its upper end, through which the hangers are inserted directly into the interior chamber of the conduit.

As the insulator-hangers fit or match the sockets in the brackets, their bearings on the brackets keep them from longitudinal or transverse displacement, as well as from falling through into the conduit. In this way fastening devices can be entirely disposed of, if desired, for the hangers when once put in place are kept in place by their engagement with the sides of the openings in the brackets, as well as by the flanges, which rest on the upper surface of the brackets.

The hangers themselves are constructed as follows: A metal holder or guard I receives an insulator J, preferably of glass or porcelain, and in the insulator is sealed a metallic head K, which is designed to connect by a bayonet-joint with a wooden beam or strip L in the interior of the conduit. When the hanger is in place, the guard extends through the opening in the conduit and protects the insulator from wear. Its upper end is squared, as shown, so that the corners constitute flanges or lugs, which support the hanger from the yoke and prevent the passage of the insulator too far through the openings provided for them. The insulators J themselves project into the conduit and are disposed vertically some little distance to one side of the slot, so that moisture can drip both from the slot-rail and the front edge of the bracket without reaching them, and thereby impairing the insulation.

Elongated openings $a\,a$ are provided in the under side of the rail E adjacent to the yokes, up through which pass bolts M, which secure the rail to the yokes, the nuts $b$ being located in the channel, where they may be readily removed. A cover or filling plate N, made in sections, is laid in the channel in the slot-rail to form a substantially flush street-surface, and this, as seen in Fig. 1, is clamped in position by the same set of bolts M which secure the rails themselves to the yokes. Over the insulators are placed independent short cover-blocks O, so that access may be had to any desired one by simply removing its coverblock and without disturbing the rest of the structure. Behind the slot-rail E is placed a guide-iron P, bolted to the yoke at its lower end and having a flange d fitting under the rail E. This holds back the pavement and prevents the entrance of dirt and moisture from the side into the interior of the conduit.

The supply-conductor Q is attached by brackets R to the wooden beam or strip L, which, as mentioned above, is sustained within the conduit by the insulators. As this strip is itself free from the sides of the conduit and as the brackets R are located at points intermediate between the insulator-hangers, it is evident that any desired insulation distance between the conductor and metal of the conduit may thus be obtained and the danger of leakage and short circuits greatly lessened. The strip is made in sections, as seen in Fig. 5, which substantially coincide in length with the distance between the transverse yokes. They are connected together endwise by a plug S, fitting into bores in the ends of the sections, and are supported near their ends by the hangers, so that all lateral displacement is avoided and compensation may be made in putting the parts together for minor variations in distance between the yokes.

The manner of putting the hangers in place may be seen from Figs. 4 and 5. The head-piece K is passed down through an opening c in the strip longer than it is wide, and the hanger is then given a quarter-turn, so that flanges e engage the strip, and the square upper end is held by the slot-rail against accidental rotation. When it is desired to remove an insulator, it will be lifted up vertically an amount sufficient to clear the socket in the slot-rail, and then by turning it as before it is freed from the strip and may be drawn vertically out through the openings in the conduit.

The supply-conductor is preferably tubular, and adjacent sections are connected together, as illustrated in Fig. 6. A plug T fits in the ends of the sections, and to keep it from sliding too far to the right or left it is provided with a central flange or stop g. Around the break between the section ends an electrical connection is established by spring-plates h, which are bolted to the conductor and allow for extension and contraction of the sections.

What I claim as new, and desire to secure by Letters Patent, is—

1. The combination, in an electric-railway conduit, of the slot-rails and transverse yokes placed at intervals, overhanging at their upper ends the air-space in the conduit, and having an opening in said overhanging portion, with the insulators for the supply-conductor removable from the conduit through said openings, as described.

2. The combination, in an electric-railway conduit, of transverse yokes at intervals apart, having brackets at their upper ends overhanging the air-space in the conduit and having an opening through which the insulators may extend, with slot-rails seated on the brackets and insulators for the supply-conductor removable through the openings in the brackets.

3. The combination, in an electric-railway conduit, of the transverse yokes and the channel slot-rails forming one, at least, of the edges of the slot and having openings at or near the yokes, with the insulators for the supply-conductor removable through said openings, as set forth.

4. The combination, in an electric-railway conduit, of the transverse yokes and channel slot-rails forming one, at least, of the edges of the slot and having openings therein for the insulators, with the insulators supported upon the yokes and removable through the said openings in the slot-rails.

5. The combination, in an electric-railway conduit, of the yokes having inwardly-projecting brackets at their upper ends and the channel slot-rails seated thereon and provided with openings registering with corresponding openings in the yoke-brackets, with the removable vertically-disposed insulators for the supply-conductor passing through said openings, as described.

6. The combination, in an electric-railway conduit, of the yokes and channel slot-rails provided, respectively, with registering openings, as described, with the insulator-hangers passing therethrough and comprising an insulator and metal holder or guard between the insulator and metal of the conduit.

7. The combination, in an electric railway, of a conduit having openings or sockets therein, with the removable insulator-hangers seated in and matching said sockets and projecting into the interior of the conduit, but so shaped that they can be removable from the conduit through said openings, for the purpose set forth.

8. The combination, in an electric railway, of a conduit having openings or sockets therein, with the removable insulator-hangers shaped so that they can be removed through said openings, comprising a metal holder or guard seated in and matching said sockets and an insulator attached to the holder and extending into the conduit, for the purpose set forth.

9. The combination, in an electric railway, of a conduit having sockets or openings therein, with the removable insulator-hangers seated in and matching said sockets and so shaped that they can be removed from the conduit through said openings, but held from passing entirely through them by suitable flanges or projections.

10. The combination, in an electric railway, of a conduit and supply-conductor, with the removable vertically-disposed insulator-hangers connected directly or indirectly with the housed supply-conductor by a bayonet-joint, permitting the ready disengagement of the hangers.

11. The combination, in an electric-railway conduit, of a readily-removable insulator-hanger connected with the supply-conductor by a bayonet or like joint, permitting ready disengagement from its connection therewith by a rotary movement of the hanger, with means for holding said hanger when in place against accidental rotation, for the purpose set forth.

12. The combination, in an electric-railway conduit, of the transverse yokes and channel slot-rails having openings leading into the conduit, with the removable insulator-hangers connected with the supply-conductor by a bayonet or like joint, permitting ready disengagement by a rotary movement, and which are engaged when in place by the slot-rail and thereby held against accidental rotation.

13. The combination, in an electric-railway conduit, of the transverse yokes and channel slot-rails having a bolt opening or openings in their under sides adjacent to the yokes, with a bolt passing through said opening and securing the slot-rail to the yoke.

14. The combination, in an electric railway, of the transverse yokes and channel slot-rails having openings in their under sides adjacent to the yoke, with the bolts secured at one end to the yokes and passing up through the openings into the channel and nuts in said channel, whereby the rails are fastened to the yokes, as set forth.

15. The combination, with a conduit for electric railways, comprising a channel slot-rail having openings through which the insulator-hangers may be removed, of cover-plates for said channel and independent comparatively short cover-blocks over the insulators, for the purpose set forth.

16. The combination, in an electric-railway conduit, of a wooden beam or strip supported by insulators at intervals within the conduit, with a supply-conductor connected to said strip at points intermediate between its own points of support.

17. The combination, in an electric-railway conduit, with a wooden beam or strip supported at intervals within the conduit in a position such that an air-space is left between the strip and conduit, of a supply-conductor connected at intervals to said strip at points intermediate between its own points of support, but insulated from the strip along the space between the respective points at which the conductor is attached to the strip and the strip to the conduit.

18. The combination of a conduit comprising transverse yokes and slot-rails with the wooden beam or strip made in sections substantially coinciding with the distance between the yokes, and a supply-conductor attached to said strip, as described.

19. The combination, in an electric-railway conduit, of the wooden beam or strip made in sections connected together endwise by a plug-and-socket joint, for the purpose described, with supports for the strip near the ends of the sections and a supply-conductor attached to the strip, as described.

20. The combination of an electric-railway conduit having openings therein and insulator-hangers removable through said openings, with the wooden beam or strip supported by the hangers and the supply-conductor connected to the strip at points intermediate between its own points of support.

21. The combination, in a conduit for electric-railways, of the transverse yokes, with the channel slot-rail, forming one, at least, of the edges of the slot and the guard-iron parallel with said rail, but behind and extending below it, for the purpose set forth.

22. The combination, in a conduit for electric railways, of the transverse yokes and channel slot-rails, with cover-plates for the channel and a single set of bolts securing the rails to the yoke and the cover-plates to the rails, as set forth.

23. The combination, in a conduit for electric railways, of the transverse yokes having raised brackets, as described, with the comparatively shallow slot-rail resting therein and a filling-piece behind said slot-rail.

In testimony whereof I have hereunto set my hand this 5th day of November, 1890.

FRANCIS O. BLACKWELL.

Witnesses:
W. M. TWOMBLY,
N. F. HAYES.